W. B. TWIFORD.
Dumping-Wagon.
No 15,987.
2 Sheets—Sheet 1.
Patented Oct 28, 1856.
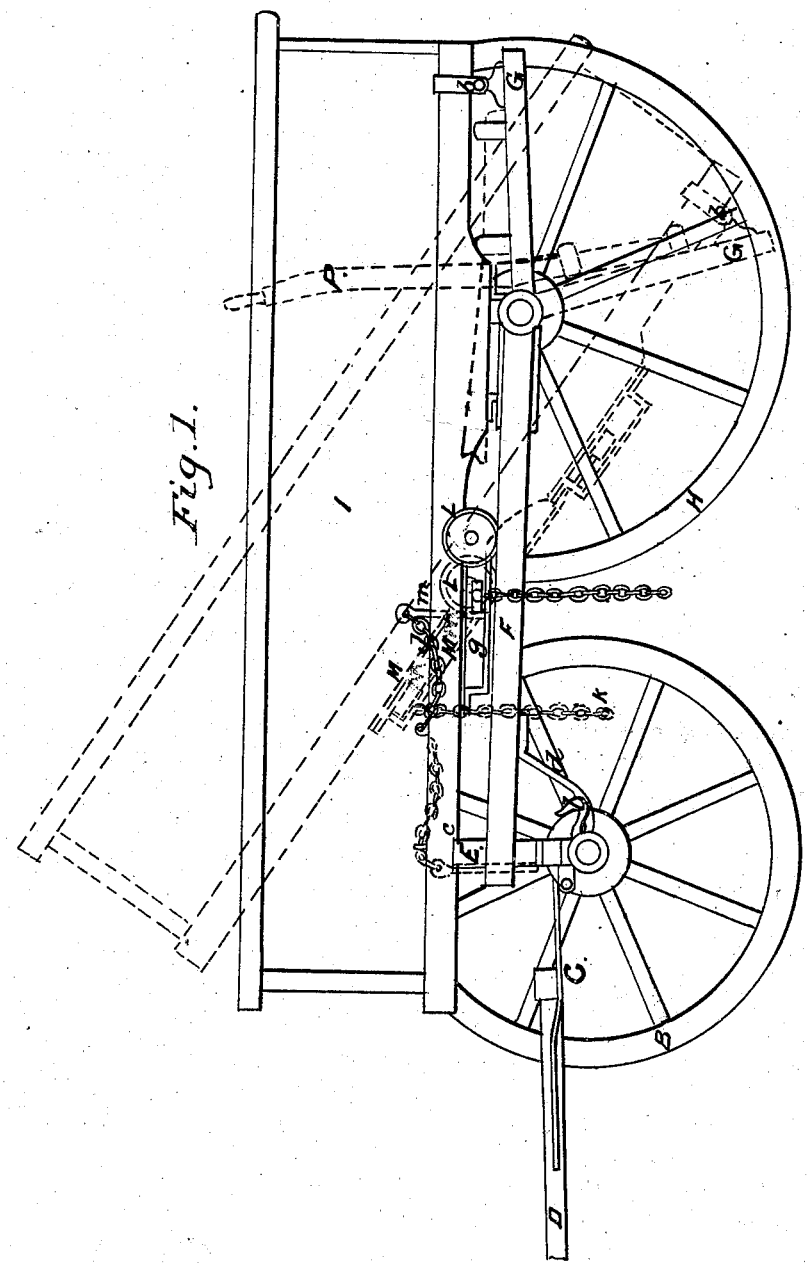

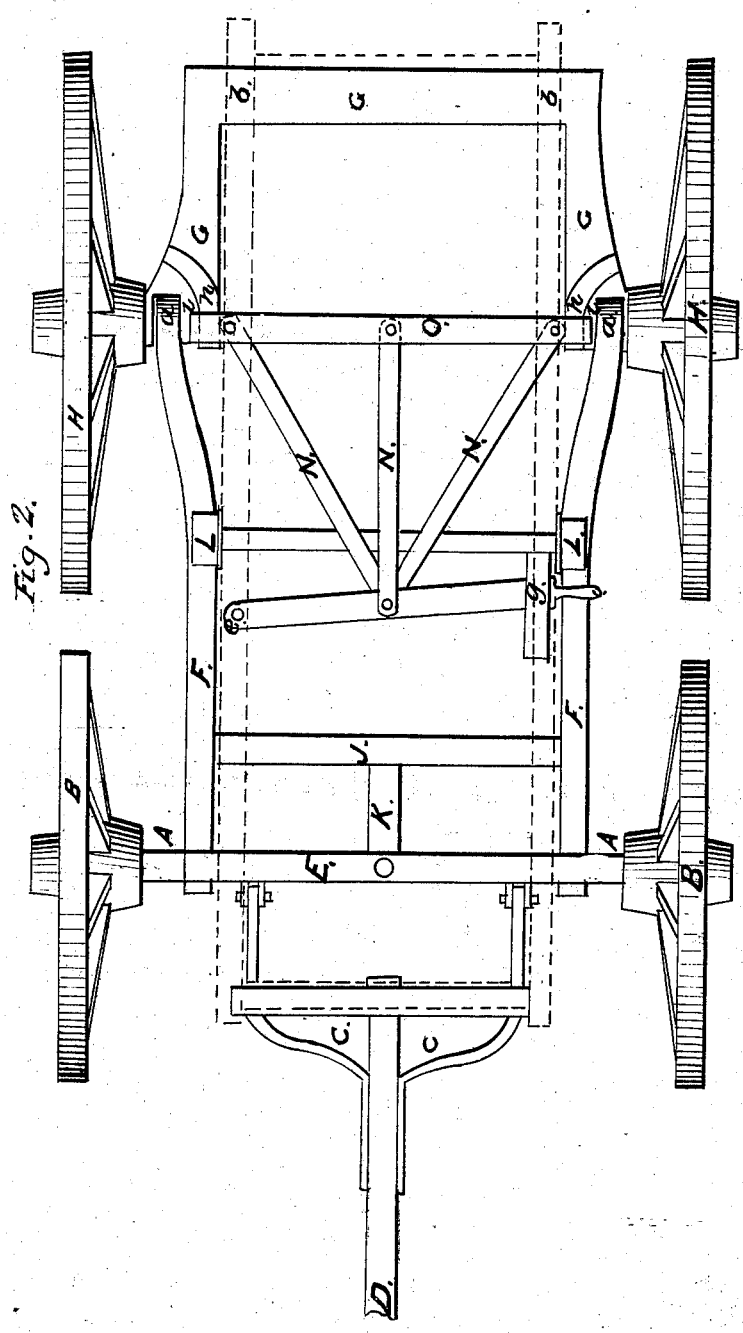

UNITED STATES PATENT OFFICE.

WILLIAM B. TWIFORD, OF HORNTOWN, VIRGINIA.

DUMPING-WAGON.

Specification of Letters Patent No. 15,987, dated October 28, 1856.

*To all whom it may concern:*

Be it known that I, WILLIAM B. TWIFORD, of Horntown, in the county of Accomac and State of Virginia, have invented certain new and useful Improvements in Dumping-Wagons; and I do hereby declare the following to be a full, clear, and exact description of the construction and operation of the same, reference being had to the accompanying drawings, making a part thereof, in which—

Figure 1 represents a side view of the wagon showing its upright position in black, and its dumped or tilted position, in red lines. Fig. 2 represents a top view, with the bed removed, but showing the parts that are connected to its underside, the frame of said bed being indicated in red dotted lines.

Similar letters of reference where they occur in the separate figures denote the same parts of the wagon in both.

To enable others skilled in the art to make and use my invention, I will proceed to describe the same with reference to the drawings.

The front axle A, with its wheels B, hounds C, and tongue D, may be of the ordinary construction. A perch or bolster E, sits on top of the axle A, and is united thereto by an ordinary king bolt, so that it may turn thereon. From each end of this perch or bolster E, extend rearward the reaches F, F, which slightly curving outward (as seen in Fig. 2) are hinged at $a$, $a$, to the rear axle G, at or near the shoulders of said axle, so that the body of the wagon may swing and drop clear of said reaches at that end. The rear axle G, is a bent one (as seen in Fig. 2) and is turned in its wheels H, H, when the rear of the body drops or is raised up again, the position of said axle being nearly vertical when the wagon bed is dumped and horizontal when righted up again.

The wagon body I, may be of the ordinary kind, and is hinged to the rear axle G at the points $b$, $b$. These being the only points at which said body or bed is attached permanently to the running gear. The front part of the bed when in the position shown in black lines Fig. 1, drops into gains cut in the ends of the perch or bolster E, as seen at $c$, and the reaches F, are united at their forward ends, for the sake of strength, by a cross piece J, and a brace K, from which may extend an iron stay $d$ (Fig. 1) which receives the lower end of the king bolt that passes through the bolster E and front axle A.

Two friction wheels L (one on each side) are connected to the bed I, which rest or run on the reaches F, when the body is dumped or raised up, and as a peculiarity in my mode of hinging the reaches to the rear axle and the rear axle to the bed as at $a$, $a$, and $b$, $b$, it will be seen by reference to Fig. 1 that the wagon body, instead of running back when dumped, really runs forward, as shown by the position of the friction wheels L, in black and in red lines. This prevents the weight from falling so heavily upon the rear axle when the bed is dumped and prevents all liability of the front wheels rising.

On the underside of the bed I, is pivoted at $e$, a lever M, the handle $f$, of which projects through a guide $g$, at that side of the wagon on which the driver walks. To this lever M, at or about its center, is connected by the rods or braces N, a latch bar O, placed at or near a line passing through the wheels H, H, at their centers, or where the rear axle would be if straight. The latch bar O, slides in suitable guides arranged underneath the bed, and upon each of its ends it has a lip turned, or a groove formed, which take over a plate or ledge $h$, $h$, laid on the shoulders $i$, $i$, of the bent axle G. When the latch bar O, rests on these plates, it takes the weight of the body and rests it on these shoulders, and by drawing the latch bar O from this position by the lever M, the body I, will immediately dump, and can be again raised up by the lever P, and locked by shifting the lever M, back to its former position. By placing a bolt $m$, (which for security is attached to the body of the wagon by a chain $j$) through the rail of the bed, and behind the lever M, said lever cannot move, so as to detach the latch bar, and consequently the bed cannot by any accident dump. There may also be attached to the lever M, a chain $k$, for working said lever by the horses, should the weight on the latch bar be too much for the driver. This is done as follows: A hook $l$ is placed in the axle A, near the "nigh wheel," and the horses are drawn around until the chain $k$ is hooked up taut onto the hook $l$. The horses are then straightened out, and the turning of the front axle draws the lever M forward and with it the latch bar, and the weight in the body will immediately dump it, or the lever M, may be operated, when heavy loads are drawn, by the lever P, which is removable from its staples in the rear axle and which can be inserted in alongside of the lever M, so as to move said lever, and with it the latch bar.

Having thus fully described the nature of my invention, what I claim therein as new and desire to secure by Letters Patent is—

The so hinging of the reach bars F, F, and the bed I, to a bent axle, as that when said axle is allowed to turn in one direction in the hubs, the wagon body shall dump, and when turned in the opposite direction be raised up horizontally, without one part being disconnected to slide or run on the other part, as herein set forth.

WM. B. TWIFORD.

Witnesses:
A. B. STOUGHTON,
THOS. H. UPPERMAN.